(12) United States Patent
Belau

(10) Patent No.: US 10,679,837 B2
(45) Date of Patent: Jun. 9, 2020

(54) DEVICE AND METHOD FOR THE PREPARATION OF SAMPLES FOR IONIZATION BY LASER DESORPTION IN A MASS SPECTROMETER

(71) Applicant: Bruker Daltonik GmbH, Bremen (DE)

(72) Inventor: Eckhard Belau, Lilienthal (DE)

( * ) Notice: Subject to any disclaimer, the term of this patent is extended or adjusted under 35 U.S.C. 154(b) by 80 days.

(21) Appl. No.: 15/819,466

(22) Filed: Nov. 21, 2017

(65) Prior Publication Data
US 2018/0166266 A1    Jun. 14, 2018

(30) Foreign Application Priority Data
Dec. 12, 2016   (DE) .......................... 10 2016 124 017

(51) Int. Cl.
*H01J 49/04* (2006.01)
*G01N 27/62* (2006.01)

(52) U.S. Cl.
CPC ........ *H01J 49/049* (2013.01); *H01J 49/0409* (2013.01); *H01J 49/0418* (2013.01); *G01N 27/628* (2013.01); *H01J 49/0459* (2013.01)

(58) Field of Classification Search
None
See application file for complete search history.

(56) References Cited

U.S. PATENT DOCUMENTS

| | | | |
|---|---|---|---|
| 4,673,651 A | 6/1987 | Rothenberg et al. | |
| 5,716,584 A | 2/1998 | Baker et al. | |
| 5,794,408 A * | 8/1998 | Patouraux | B32B 15/08 53/432 |
| 5,841,136 A * | 11/1998 | Holle | H01J 49/0418 250/288 |
| 6,508,986 B1 * | 1/2003 | Anderson | B01L 9/54 250/288 |
| 9,496,124 B2 * | 11/2016 | Gunther | H01J 49/0409 |
| 2004/0029258 A1 | 2/2004 | Heaney et al. | |
| 2004/0266023 A1 | 12/2004 | Clark et al. | |
| 2005/0056776 A1 | 3/2005 | Willoughby et al. | |

(Continued)

FOREIGN PATENT DOCUMENTS

| | | |
|---|---|---|
| DE | 4200497 A1 | 7/1993 |
| DE | 19628112 A1 | 11/1998 |
| WO | 0003805 A1 | 1/2000 |

(Continued)

*Primary Examiner* — James Choi
(74) *Attorney, Agent, or Firm* — Benoit & Côté Inc.

(57) ABSTRACT

Presented is a device for the preparation of samples for ionization by laser desorption, especially MALDI, that comprises a sample support assembly with a surface which has an array of sites for holding substances, and an outer contour surrounding the sample site array, and a flat cover which can be placed flush on or over the surrounding outer contour such that a shielded gas compartment is formed between the cover and the surface, said cover having an array of apertures arranged such that each aperture comes to rest over a corresponding sample site. A gas transport system is also provided on the assembly and cover, which serves to introduce a protective gas into the shielded gas compartment between cover and surface so that a protective gas atmosphere is generated in the gas compartment to protect the substances on the sample sites against atmospheric influences. An associated method is also described.

13 Claims, 4 Drawing Sheets

(56) References Cited

U.S. PATENT DOCUMENTS

2013/0162991 A1* 6/2013 O'Connor ............ G01J 3/0291
356/317
2016/0339427 A1 11/2016 Wiktor

FOREIGN PATENT DOCUMENTS

WO 00/41214 A1 7/2000
WO 0116574 A1 3/2001

* cited by examiner

DEVICE AND METHOD FOR THE PREPARATION OF SAMPLES FOR IONIZATION BY LASER DESORPTION IN A MASS SPECTROMETER

BACKGROUND OF THE INVENTION

Field of the Invention

The invention relates to applications in the field of mass spectrometry. In order to measure substances of interest mass spectrometrically, they must be transferred into the gaseous phase, unless they are already gaseous, and ionized. For sample substances which are originally liquid or solid, in particular, the ions are preferably produced with an ionization method which uses laser desorption, especially matrix assisted laser desorption/ionization (MALDI).

Description of the Related Art

Since being developed in the 1980s, MALDI has brought about crucial advances in the mass spectrometric analysis of large molecules and polymers as well as biopolymers, for example peptides and proteins. In this field, it is common practice to couple a MALDI ion source with a time-of-flight mass spectrometer (TOF) as the mass analyzer. MALDI-TOF mass spectrometry exhibits a high level of sensitivity and is particularly suitable for large and complex molecules, which is of great importance for applications in biology and for chemical analyses.

As the specialist is well aware, MALDI is based on the co-crystallization of a matrix substance and the analyte of interest in the sample with a molar excess of matrix molecules of $10^2$ to $10^5$. During the growth, the analyte molecules embed themselves into the crystals of the matrix substance. Usually, successful co-crystallization requires a ratio of analyte molecules to matrix molecules of around 1/5000 (mol/mol). Small organic molecules that strongly absorb energy at specific laser wavelengths, for example at 337 nanometers for nitrogen lasers, are often chosen as the matrix substance. Sinapic acid, 2,5-dihydroxybenzoic acid and α-cyano-hydroxycinnamic acid can be named here as examples. The excitation is performed using short, high-energy laser pulses of, for example, two to five nanoseconds' duration. After relaxation in the crystal lattice, the excitation leads to the explosive transfer of small amounts of substance on the surface of the matrix crystal into a hot plasma. The embedded analyte molecules, together with the matrix, are transferred from the ion source into the vacuum of the mass spectrometer and thus become accessible for mass spectrometric analysis.

An essential part of a MALDI-based mass spectrometric measurement is the sample preparation and the application onto the sample support. The person skilled in the art is familiar with different methods, such as the so-called dried droplet method, which ultimately comprises the mixing of an analyte solution and a matrix solution with subsequent vaporization of the solvent used, or so-called thin layer preparation. Several means of sample preparation have been described in the past and are known to the person skilled in the art. One example to mention here is the brochure published by the applicant in Sep. 2012 entitled "Bruker Guide to MALDI Sample Preparation", in which different types of sample support plates and a selection of possible matrix substances are presented.

The previous patent applications by the applicant DE 196 28 112 A1 (corresponding to GB 2 315 328 A and U.S. Pat. No. 5,841,136 A) and DE 196 28 178 C1 (corresponding to GB 2 315 329 A and U.S. Pat. No. 5,770,860 A) disclose an introduction port for flat sample supports into the vacuum system of a mass spectrometer, said introduction port comprising an evacuable cartridge for receiving the sample supports, and a method for rapidly and simultaneously applying a large number of samples in solution from microtitration plates to a MALDI sample support plate. Both documents mention in passing that some sensitive sample substances are preferably applied to the sample support under a protective gas.

The U.S. Pat. No. 6,508,986 B1 (Anderson et al.) describes an alignment plate designed in the form of an aperture mask, whose arrangement of apertures corresponds to the sample site array of a MALDI sample support plate positioned underneath it and serves to guide the pipette when sample substances are being applied.

The international publication WO 2015/074959 A1 discloses a nebulizing system with a closed chamber with controllable atmosphere in which MALDI sample preparations can be conducted in an inert gas atmosphere.

Given the information above, a need exists in the technical field to provide devices and methods with a not very complex protective gas system with which sensitive substances also can be applied to a sample support.

SUMMARY OF THE INVENTION

The invention is based on the finding that certain sensitive sample substances can be chemically changed when exposed to the atmosphere. For example, a protein-containing liquid sample can react with oxygen in the air, thus oxidizing the proteins. The sample composition is thus changed and falsified, which can make the interpretation of the mass spectrometric analysis results much more difficult.

As has already been mentioned, closed chambers are known in which the gas composition can be set. However, this closed design means that elements within it, such as a sample support, are not accessible from the outside, or only with considerable effort.

Taking this as the starting point, the invention relates to a device for the preparation of samples for ionization by laser desorption, especially matrix assisted laser desorption (MALDI), said device comprising a sample support assembly with a sample support surface which has an array of sites for holding substances, for example with a total of 48, 96, 384 or 1536 sites, and an outer contour surrounding the sample site array, and a flat cover which can be placed flush on or over the surrounding outer contour such that a shielded gas compartment is formed between the cover and the surface, said cover having an array of apertures arranged so that each aperture comes to rest over a corresponding sample site. A gas transport system is provided on the sample support assembly and cover which serves to introduce a protective gas into the shielded gas compartment between cover and surface (for example by pumping) so that a protective gas atmosphere is generated in the gas compartment by means of, for example, an inert gas such as a noble gas (Ne, Ar, etc.) or nitrogen $N_2$, and said atmosphere protects the substances applied to the sample sites against atmospheric influences.

The invention uses the finding, which at first sight contradicts technical teaching and is thus quite surprising, that even in a gap-like gas compartment below a cover full of holes, which naturally provides the confined gas with many opportunities to escape, a protective gas atmosphere can be set up which shields the substances applied to the sample support against atmospheric influences, for example oxidization with oxygen from the air, and thus facilitates unfalsified mass spectrometric measurements, while application tools are guided to the sample sites through the apertures in the cover.

In preferred embodiments, the sample support assembly can have a conductive plate with a surface which comprises the array of sample sites, and the plate determines the surrounding outer contour, for example. The cover can be in flush contact with the narrow sides of the sample support plate, thereby largely sealing off this part of the device so that it is gastight, for example.

In further embodiments, the sample support assembly can have a conductive plate with a surface which comprises the array of sample sites and which can be accommodated in a holder, said holder determining the surrounding outer contour. The holder can have a circumferential groove, for example, on which the cover is set down. In a simple case, the holder consists of a supporting surface for positioning a sample support plate, with alignment markings arranged thereon, where appropriate. In certain versions of the device, the cover can fit flush with the narrow sides of the holder so that the device is largely sealed gastight against the surrounding atmosphere at this position.

The surrounding outer contour can have a rectangular form and, for example, be dimensioned such that a sample support with the dimensions of a microtitration plate (length×width×height in accordance with ANSI standard on the recommendation of the Society for Biomolecular Screening (SBS) 127.76 mm×85.48 mm×14.35 mm) can be placed on the surrounded surface within the contour. The space between the sample support surface and the underside of the cover, i.e. the height of the shielded gas compartment, can be a few millimeters, for example ten millimeters. When the cover is positioned with a flush fit around the narrow sides of the sample support, the sample support has the dimensions of a microtitration plate, and the space between it and the cover is ten millimeters, the gas compartment volume amounts to approx. $1.09 \times 10^2$ cubic centimeters.

In preferred embodiments, the cover has the form of a cap whose side walls extend at right angles and which can be placed flush around the sample site array.

In further embodiments, the holder has a border of side walls extending at right angles. The flat cover preferably has the form of a plate and can be placed upon the side walls. The upper narrow sides of the side walls can be stepped to create a supporting surface for the cover plate.

In preferred embodiments, the protective gas can be fed laterally into the gas compartment from the sample site array and/or at least partially drawn off from the gas compartment. Here, laterally essentially means beyond a projection of the sample support surface, along a corresponding surface normal.

In further embodiments, the gas transport system comprises gas channels integrated in the side walls, gas inlets into the shielded gas compartment and, if required, gas outlets from the shielded gas compartment through which the protective gas flows during the sample application process.

In additional embodiments, the gas transport system can comprise a tube which passes through a hole in one of the side walls and has apertures arranged on its cylindrical exterior surface as gas inlets into the shielded gas compartment.

The flow cross-sections of the gas inlets and gas outlets are preferably dimensioned such that a protective gas atmosphere at a pressure slightly above atmospheric pressure exists in the gas compartment. This overpressure can be around 10 to 100 pascal, preferably around 50 pascal, above the ambient pressure. The average atmospheric pressure at sea level is around $10^5$ pascal, for example.

The invention relates furthermore to a method for the preparation of samples for ionization by laser desorption, particularly matrix assisted laser desorption MALDI, where a) a sample support assembly with a sample support surface is provided, said surface having an array of sites for the acceptance of substances, and an outer contour which surrounds the sample site array, b) a flat cover with an array of apertures is placed with a flush fit on or over the surrounding outer contour such that a shielded gas compartment is formed between the cover and the surface, and each aperture comes to rest over a corresponding sample site, c) a protective gas atmosphere is generated in the shielded gas compartment between cover and surface by feeding in a protective gas, and d) substances are applied to the sample sites by guiding the tip of an application tool, for example a pipette or inoculation loop, through the apertures of the cover to the corresponding sample sites.

In various embodiments, the apertures in the cover can all have elastic lamellae which generate an additional flow resistance for the protective gas when no application tool is being passed through them.

BRIEF DESCRIPTION OF THE DRAWINGS

The invention can be better understood by referring to the following figures. The elements in the figures are not necessarily to scale, emphasis instead being placed upon illustrating the principles of the invention (often schematically). In the figures, corresponding parts are generally designated by identical last two digits of the reference numerals throughout the different views.

DETAILED DESCRIPTION

While the invention has been shown and described with reference to a number of different embodiments thereof, it will be recognized by those skilled in the art that various changes in form and detail may be made herein without departing from the scope of the invention as defined by the appended claims.

The invention is based in particular on the finding that some substances used for the preparation of samples for ionization with laser desorption require a protective, inert atmosphere in order that they are not changed chemically as they are being applied to the sample support. Taking this as the starting point, this disclosure describes very simple, user-friendly devices and methods.

Sample supports in the field of ionization with laser desorption usually have the form of a plate, where an array of sample sites is present or can be produced on one of the flat sides. It is possible to apply visible markings on one side of the sample support, for example, to indicate to the user where they have to deposit liquid (e.g. solvents or matrix solutions) or solid sample substances (e.g. microbe sediments).

Figure 1:
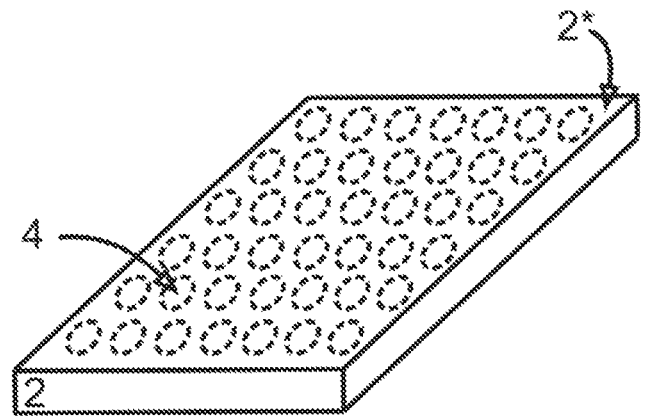
FIG. 1 shows a sample support plate.

FIG. 1 shows a possible sample support plate 2 in an isometric plan view in a greatly simplified and schematic way. In this example, an array of 6×7 sample sites 4 is identified on one lateral face 2* of the plate 2 and highlighted slightly to guide the user when applying the substance manually. It shall be understood that the array configuration can differ from the one shown here. It is usual to use, for example, plates 2 with the dimensions of a microtitration plate and a standardized number of sample sites 4 such as 48, 96, 384 or 1536. To ensure the plate 2 is conductive, it can be made completely of a conductive material such as metal. Alternatively, plates 2 can be manufactured which comprise a non-conductive substrate onto which a conductive layer has been applied. Particulars of this and many further designs have already been described in the prior art and are known to the specialist without any further explanation.

Figure 2:
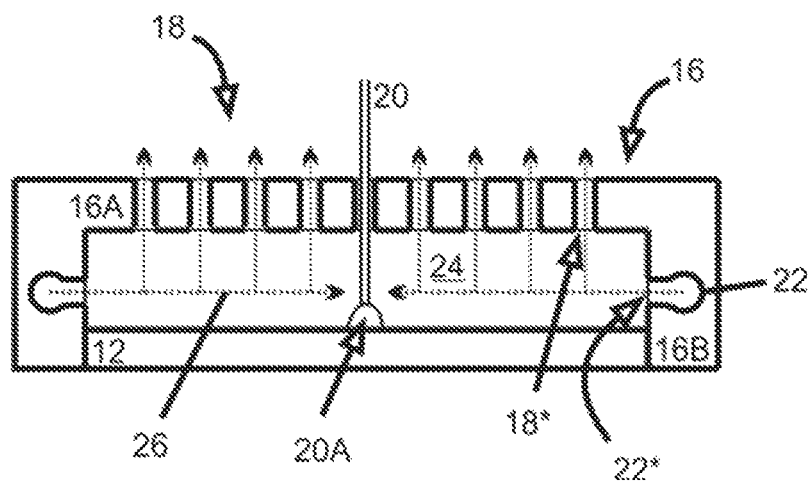
FIG. 2 shows a schematic lateral cross-section of a protective gas device.

FIG. 2 depicts a schematic of a first example embodiment of the invention in a side view. It is based on a sample support plate 12 which is rectangular in shape in this example. A cover in the form of a cap 16 can be placed around the plate 12. This cap has a covering side 16A, which is opposite the plate 12, and has side walls 16B which extend at right angles from this covering side 16A. The dimension between the inner surfaces of the side walls 16B is designed such that the cover encloses the sample support plate 12 with a flush fit when the cap 16 is placed over the plate 12. In order to improve the gastight seal between the inner surfaces of the side walls 16B and the narrow sides of plate 12, a sealing material can additionally be affixed at the corresponding contact points, for example a slightly protruding, elastic rubber material in the lower part of the side walls (not shown).

The covering side 16A of the cap 16, i.e. the side which comes to rest opposite the sample support plate 12, has an array of apertures 18, here in the form of simple cylindrical holes 18* with a constant cross-section. The apertures 18* are dimensioned such that the tip of an application tool fits through them, for example a pipette tip 20, as shown, to dispense a liquid substance 20A, with outer diameters always in the low millimeter range or even smaller, in the high micrometer range, depending on the amounts of liquid to be dispensed. The array of apertures 18 is designed such that each aperture 18* is opposite a corresponding sample site on the plate 12. It will often be the case that no sample sites not paired with corresponding apertures 18* are present. This does not necessarily mean that each sample site must have an aperture 18* opposite it, however. For certain applications, it may be useful to provide different covers with aperture arrays 18 of different designs, for example a first cover with a row of apertures 18* which allow access to a first row of sample sites on a sample support plate 12, and a second cover with a row of apertures with a lateral offset relative to the first row, which allow access to an adjacent row of sample sites on the same sample support plate 12. The specialist has a great deal of scope in respect of the design layout.

Also shown in FIG. 2 is part of a gas transport system which comprises gas channels 22 running in the side walls 16B of the cap 16, perpendicular to the plane of the diagram, and gas inlets 22* originating from the channels 22 into the shielded gas compartment or gap 24 between cap 16 and sample support plate 12 in the example shown. The flow direction of the inert protective gas, for example a noble gas such as argon or molecular nitrogen $N_2$, is indicated schematically by dashed arrows 26. In the example shown, the protective gas escapes to the atmosphere via the apertures 18* in the cover. A continuous flow of protective gas as samples are being applied to the sample support plate 12 ensures that any damaging atmospheric influences are kept away from the liquid 20A dispensed in the example depicted until the liquid 20A has dried, for example, and is thus much less susceptible to such influences. A dry protective gas can also be used to promote and accelerate the vaporization of liquid samples on the sample support plate 12. To this end, the protective gas can even be heated slightly before it is fed into the gas compartment or gap 24.

Figure 3:
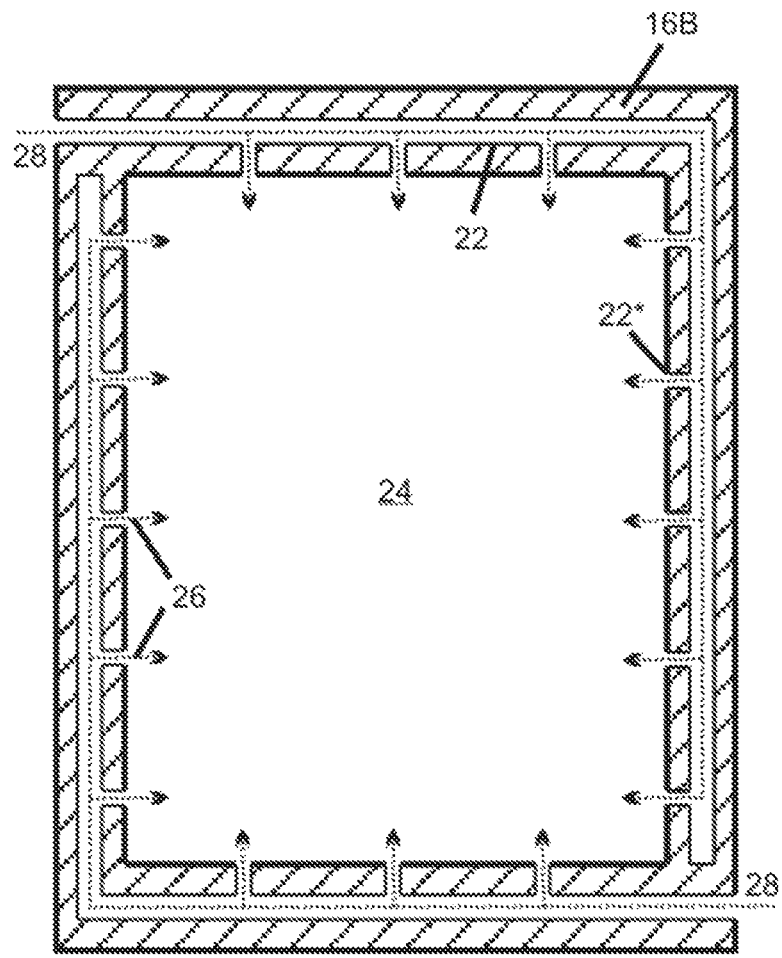
FIG. 3 shows a cross-section of a cover for a protective gas device.

The arrangement of gas channels 22 and gas inlets 22* is illustrated in more detail in FIG. 3. It shows a cross-section through the cover in the form of a cap 16 approximately at the level of the channels 22 and inlets 22* as in FIG. 2. Starting from two interfaces 28 to the outside, which are provided for coupling to a suitable gas source or suitable gas sources (not shown here), two roughly L-shaped gas channels 22 extend across almost the total length and width of the corresponding side wall 16B. Each gas channel section has a specific number of branches, which serve as gas inlets 22* to feed the protective gas into the gas compartment or gap 24 between sample support and cover. Three branches on the short and five on the long transverse sides are shown by way of example. Dashed arrows 26 represent a schematic illustration of the flow pattern of the protective gas from the outside to the inside. It shall be emphasized here that the division into two separate gas channels 22 must be understood as one possible embodiment. Basically, it is also possible for only one single gas channel 22 to be provided in the side walls 16B, which could then encircle almost the whole perimeter of the interior, for example, and could have a suitable number of branches. The inlets 22* preferably have a smaller flow cross-section than the connected channel 22 in order to ensure a largely uniform distribution of the protective gas with largely uniform pressure conditions over the whole length of the channel.

Figure 4:
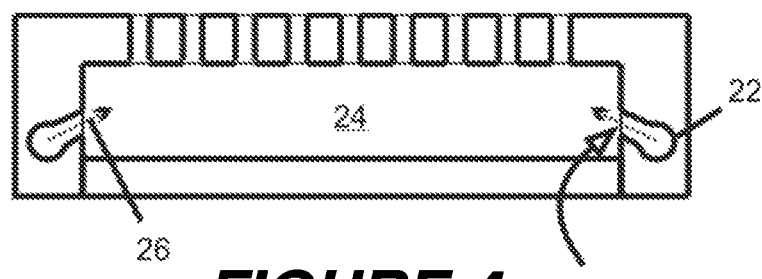
FIG. 4 shows a schematic side view of a further protective gas device.

FIG. 4 shows a slight modification of the cover depicted in FIG. 2 in the form of a cap 16 such that the branches, which serve as gas inlets 22* for the protective gas feed into the gas compartment or gap 24 between sample support and cover, do not open into the gap 24 at the same level as the gas channels 22 but instead have an upwards slant in order to provide the gas flowing into the gap 24 with a predetermined flow pattern. This can ensure that the atmospheric air in the gap 24 is more rapidly exchanged for protective gas when the gas transport system is started up, when substances are to be applied to a sample support, and thus for faster operational readiness of the device.

Figure 5:
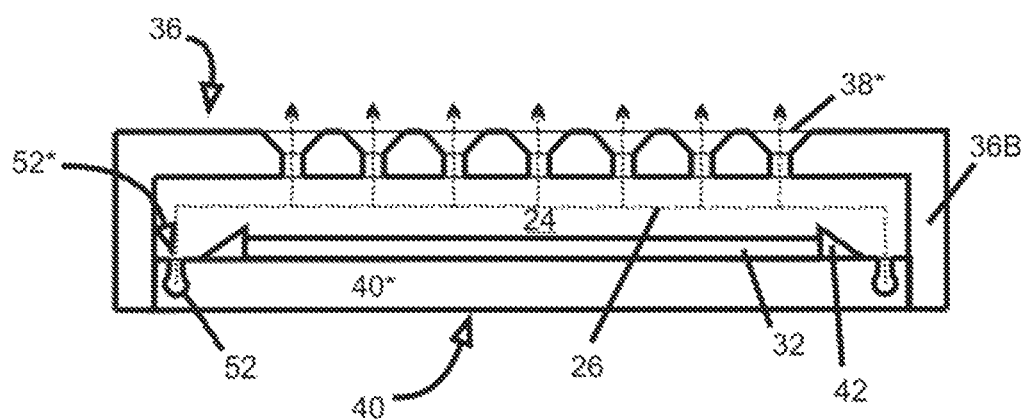
FIG. 5 shows a schematic lateral cross-section of a further protective gas device.

FIG. 5 shows a further possible variant of a protective gas device which has several modifications compared to those previously described. Firstly, the apertures 38* in the cover, which provide access to the sites on the sample support 32 below, are not simply cylindrical throughout, but begin with a conically tapering segment, which ultimately produces a funnel shape. This makes it easier for a user to introduce and center an application tool like an inoculation loop. Secondly, the cover in the form of a cap 36 is not placed flush around the sample support 32 itself, but around a holder 40 assigned to the sample support. In this example, the sample support 32 lies flat in a specific position identified by markings 42 on a support 40*. The inner surfaces of the side walls 36B of cap 36 close off the gas compartment or gap 24 between cover and sample support 32 and holder 40 at the bottom and the sides so that protective gas cannot escape, or scarcely. Additional sealing measures at this position can also be carried out, as outlined in the context of previously described embodiments.

A further notable difference between the design in FIG. 5 and those in FIGS. 2 and 4 is that the gas transport system with its channels 52 and inlets 52* is integrated into the holder 40 of the sample support 32, and not into the body of the cap. The channels 52 can extend through the holder 40 and, in the outer edge areas which are not occupied by the sample support 32, they can have branches into the gas compartment or gap 24 between sample support 32 or holder 40 and cover, through which the protective gas is fed in. This means the protective gas flows over the sample site array as before from a lateral direction. The flow pattern of the protective gas is indicated schematically by dashed arrows 26. The variant shown in FIG. 5 can be advantageous because the holder 40, which is important for the gas feed, can be installed in a fixed position, and is thus easier to connect to an existing protective gas supply. Complex disconnecting and reconnecting to the gas supply (not shown) can thus be avoided.

Figure 6:
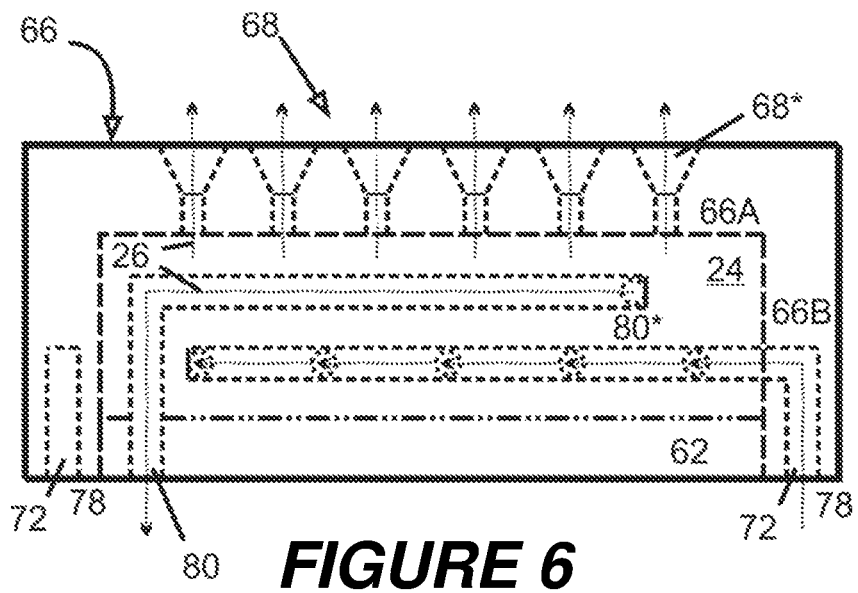
FIG. 6 shows a schematic side view of a further protective gas device.

FIG. 6 shows a further embodiment of a protective gas device in a schematic side plan view. The cover has the form of a cap 66 as before and has an array of funnel-shaped apertures 68*. The side walls 66B of the cap 66 enclose a sample support 62 so as to fit flush with it. As before, gas channels 72 and branches for feeding the protective gas into the gas compartment or gap 24 between cover and sample support 62 are integrated in the side walls 66B of the cap 66, which extend roughly at right angles from a covering side 66A containing the apertures 68*. These gas channels are indicated schematically by dashed contours.

A difference to the previous examples consists in the fact that the connections 78 to a source of protective gas or the sources of protective gas (not shown here) are not arranged laterally but at the lower narrow sides of the side walls 66B. This design is feasible particularly when the protective gas source has a stop valve which can be opened when the cap 66 is put on, either by contact with the side walls 66B or by means of operating features positioned there (not shown). It is then possible to trigger the supply of protective gas at the same time as lowering the cover. If several such connections 78 are distributed along the side walls 66B, they can simultaneously serve as alignment aids to ensure that the cover is correctly positioned.

A further addition to the previously described embodiments consists in the sidewalls 66B of the cap 66 not just having one gas channel system 72 with branches for the introduction of protective gas into the gas compartment or gap 24, but also having a second, separate gas channel system 80 with branches 80* to allow the protective gas to flow out from the gap 24. The flow direction of the protective gas is illustrated schematically by dashed arrows 26. This protective gas outflow can be used to balance the mass flow of the influx of protective gas through the first channel system 72 and the outflow of the protective gas through the apertures 68* in the cover as desired in order to, for example, build up certain overpressure conditions in the gap 24. To take into account the protective gas outflow through the apertures 68* in the cover, the second gas channel system 80 has fewer branches than the first gas channel system 72, in the example explained only one gas outlet 80* per side of the cap 66 (i.e. a total of four). It shall be understood that the side walls 66B fundamentally provide sufficient space to accommodate two or even more gas channel systems for different purposes. As before, the branches 80* can have a smaller diameter than the corresponding channels 80 in order to increase the relative flow resistance.

Figure 7:
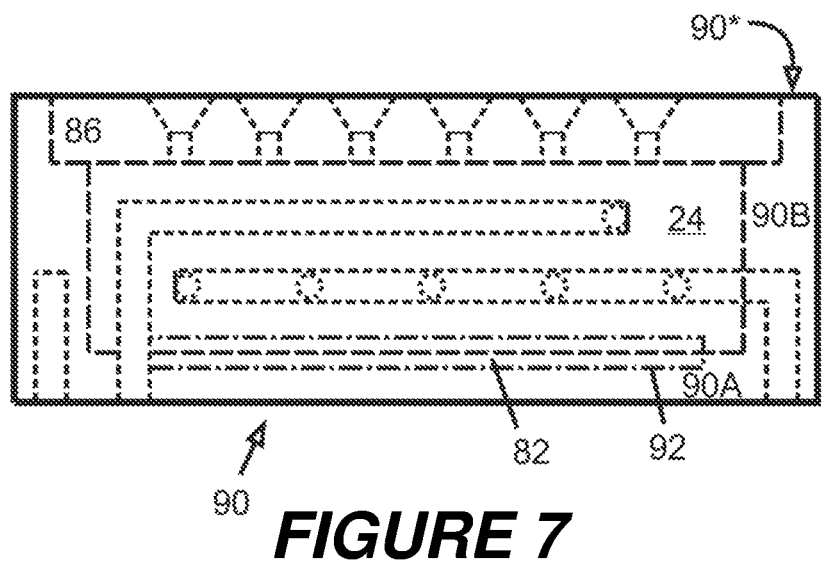
FIG. 7 shows a schematic side view of a further protective gas device.

FIG. 7 shows a further, slightly modified embodiment compared to the example in FIG. 6. The gas flow arrows have been omitted here for reasons of clarity. One difference consists in the fact that the cover does not have the form of a cap in this example, but simply the form of a plate 86. In contrast to this, the sample support assembly comprises not only a sample support 82 as in the example from FIG. 2, but also a holder 90, which has side walls 90B protruding (upwards) at right angles from a base 90A. The base 90A of the holder 90 has a recess 92, which is adapted to the exterior dimensions of the sample support plate 82 so that it can accommodate the sample support plate. As is shown, roughly half of the plate 82 is recessed into the base 90A and roughly half the thickness of the plate projects above the base 90A. The top end surfaces 90* of the side walls 90B are stepped, the step being dimensioned such that it can accommodate the cover plate 86 with a flush fit and hold it in a fixed position. As has already been explained, the seal at the contact points between cover plate 86 and side wall step can be improved with a layer of sealing material. The cover plate 86 can be inserted into the stepped support and removed again by means of a suction device (not shown), for example. In this embodiment, the shielded gas compartment or gap 24 between sample support 82 and cover is limited laterally by the side walls 90B of the sample support holder 90 and not by the side walls of a covering cap.

Figure 8:
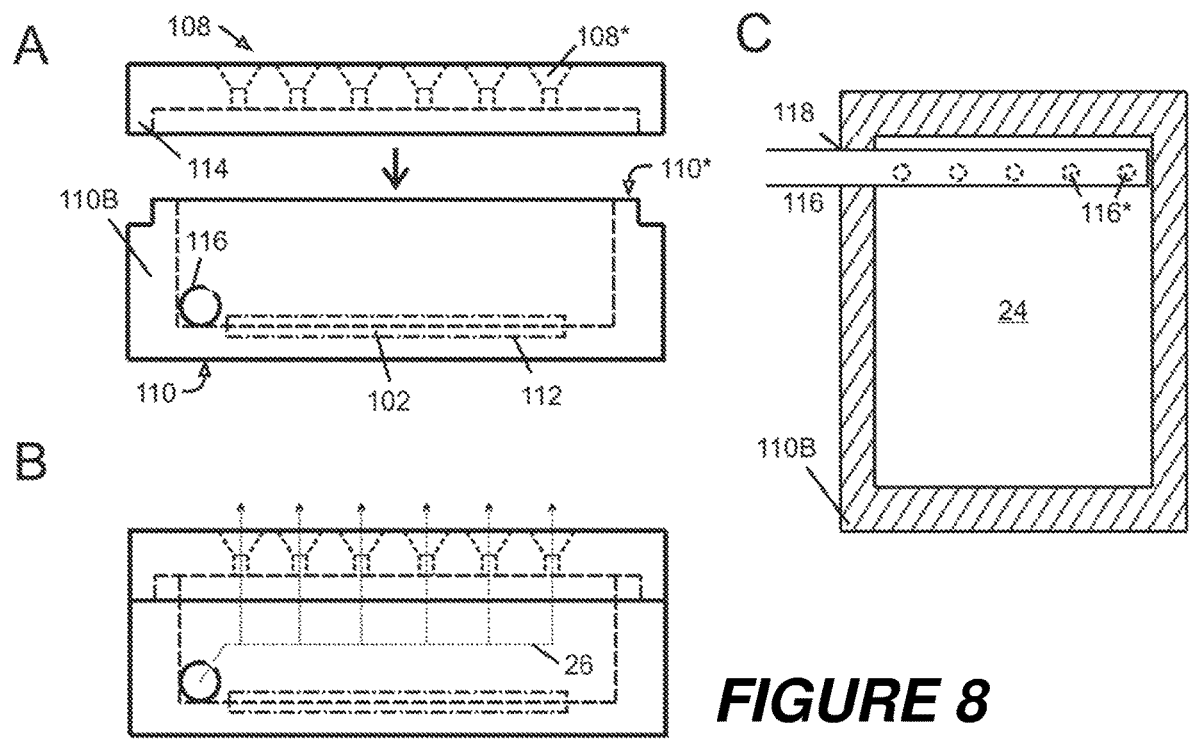
FIG. 8 shows a further example embodiment of a protective gas device in three views A, B and C.

FIG. 8 shows an additional variant, slightly modified compared to previous embodiments, of a protective gas device in different views A, B and C. For the purpose of this example, the sample support assembly has a sample support plate 102, which is held in a half-sunken position in a recess 112, similar to before. In addition to this, it features a holder 110 with side walls 110B extending at right angles and stepped at the upper short sides 110*. In this case, however, the step runs from the outside to the inside, and serves as a flush-fitting support for the cover, which is adapted to the dimensions and has a slightly protruding collar 114 and an array 108 of funnel-shaped apertures 108*. The views A and B illustrate how the cover is placed in the direction of the arrow onto the side walls 110B of the holder 110.

A further difference to the devices described earlier consists in the design of the gas transport system. Instead of making it an integral part of the side walls 110B of covering cap or holder 110, in this example a cylindrical tube 116 is fed through a peripheral aperture 118 in one of the side walls 110B and into the gas compartment or the gap 24 between cover and base and sample support plate 102 (cf. view C). The tube 116 contains a row of apertures 116* in the cylindrical body (similar to a "flute"), through which a protective gas flows when the device is in operation. The arrangement of the gas inlets 116* is similar to one of the previously described embodiments in that the gas is introduced laterally, but not parallel to the sample support plate 102. Instead, it has a slightly upwards, vertical flow component. The protective gas flow is indicated schematically by dashed arrows 26. The version shown here has the advantage that the tube 116 can easily be extracted laterally from the wall and replaced, for example when a different tube with a different aperture configuration is to be used, or in order to clean the tube and then re-insert it.

Figure 9:
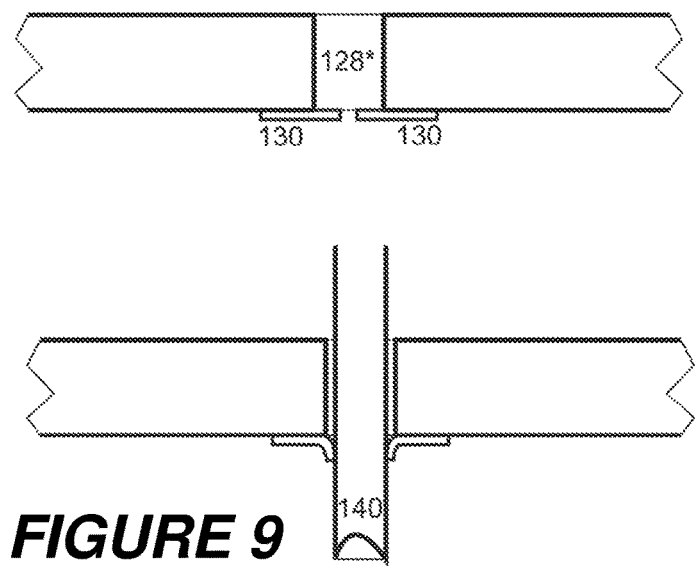
FIG. 9 shows two views of a special layout of the apertures in the cover of a protective gas device.

FIG. 9 is a schematic representation of how the gas flow resistance through the apertures 128* of the cover can be increased, which reduces the rate of protective gas leakage. To this end, elastic lamellae 130 can be provided at the apertures 128*, which reduce the cross-sectional area of the apertures 128* available for the flow and thus also reduce the leakage rate of the protective gas, but can be bent back by the tip 140 of an application tool without any noticeable mechanical resistance, as illustrated in the lower part of FIG. 9. When the tip 140 is withdrawn again, once sample application is complete, the lamellae 130 relax back to their original position and reduce the cross-section again. Modifications to this type of cover are particularly suitable for disposable products, i.e. covers which are intended for single use.

Figure 10:
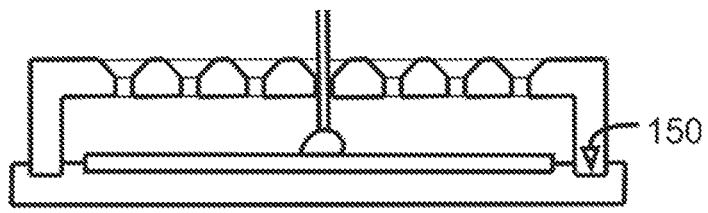
FIG. 10 shows a schematic side view of a further protective gas device.

FIG. 10 shows a schematic of yet another embodiment for the protective gas device in a side view. The device has a holder whose recess accommodates a sample support plate, and the holder has a circumferential groove 150 in which the narrow sides of the side walls of a cover designed as a cap can be placed.

The invention has been described above with reference to different, specific example embodiments. It is understood, however, that various aspects or details of the invention can be modified without deviating from the scope of the invention. In particular, characteristics and measures disclosed in connection with different embodiments can be combined as desired if this appears practicable to a person skilled in the art. In addition, the above description serves only as an illustration of the invention and not as a limitation of the scope of protection, which is exclusively defined by the enclosed claims, taking into account any equivalents which may possibly exist.

The invention claimed is:

1. Device for the preparation of samples for ionization by laser desorption, comprising:
   a sample support assembly with a surface which has an array of sites for the acceptance of substances, and an outer contour surrounding the sample site array, and
   a flat cover which can be placed with a flush fit on or over the surrounding outer contour such that a shielded gas compartment is formed between the cover and the surface, and which has an array of apertures arranged such that each aperture comes to rest over a corresponding sample site, wherein
   a gas feed system is provided on the sample support assembly and cover with which a protective gas is introduced directly into the shielded gas compartment between cover and surface through one or more inlet(s) separate from the array of apertures so that a protective gas atmosphere is created in the gas compartment which protects the substances during their application to the sample sites against atmospheric influences, the protective gas escaping from the compartment via the apertures.

2. The device according to claim 1, wherein the sample support assembly has a conductive plate with a surface which comprises the array of sample sites, and the plate determines the surrounding outer contour.

3. The device according to claim 1, wherein the sample support assembly has a conductive plate, which can be accommodated in a holder and has a surface which comprises the array of sample sites, and the holder determines the surrounding outer contour.

4. The device according to claim 3, wherein the holder is bordered by sidewalls which extend at right angles, and the flat cover has the form of a plate and can be placed on the sidewalls.

5. The device according to claim 1, wherein the protective gas is fed into the gas compartment from the side of the sample site array and/or is at least partially drained from it.

6. The device according to claim 1, wherein the surrounding outer contour is rectangular in shape.

7. The device according to claim 1, wherein the cover has the form of a cap with sidewalls extending at right angles, and which can be placed flush around the sample site array.

8. The device according to claim 7, wherein the gas feed system comprises gas channels and gas inlets into the shielded gas compartment which are integrated in the side walls.

9. The device according to claim 7, wherein the gas feed system comprises a tube which passes through an aperture in one of the side walls, the tube having apertures arranged on its cylindrical exterior surface which act as gas inlets into the shielded gas compartment.

10. The device according to claim 7, wherein the gas feed system comprises gas outlets from the shielded gas compartment which are integrated in the side walls.

11. The device according to claim 10, wherein the flow cross-sections of the gas inlets and gas outlets are dimensioned such that a slight overpressure of protective gas atmosphere is established in the gas compartment.

12. Method for the preparation of samples for ionization by laser desorption, particularly matrix assisted laser desorption, the method comprising:
   a) providing a sample support assembly with a surface which has an array of sites for the acceptance of substances, and an outer contour surrounding the sample site array;
   b) placing a flat cover with an array of apertures with a flush fit on or over the surrounding outer contour such that a shielded gas compartment is formed between the cover and the surface, and each aperture comes to rest over a corresponding sample site;
   c) generating a protective gas atmosphere in the shielded gas compartment between cover and surface by feeding directly into the gas compartment through one or more inlet(s) separate from the array of apertures a protective gas that escapes from the compartment via the apertures; and
   d) applying substances to the sample sites by passing the tip of an application tool through the apertures in the cover to the corresponding sample sites.

13. Device for the preparation of samples for ionization by laser desorption, comprising:
   a sample support assembly with a surface which has an array of sites for the acceptance of substances, and an outer contour surrounding the sample site array, and
   a flat cover which can be placed with a flush fit on or over the surrounding outer contour such that a shielded gas compartment is formed between the cover and the surface, and which has an array of apertures matching the array of sample sites and arranged such that each aperture comes to rest over a corresponding sample site,
   wherein
   a gas feed system is provided on the sample support assembly and cover with which a protective gas is introduced directly into the shielded gas compartment between cover and surface so that a protective gas atmosphere is created in the gas compartment which protects the substances during their application to the sample sites against atmospheric influences, the protective gas escaping from the compartment via the apertures.

\* \* \* \* \*